June 25, 1957 D. G. RENNO 2,797,127
VEHICLE DOOR STRUCTURE
Filed Feb. 6, 1956 2 Sheets-Sheet 1
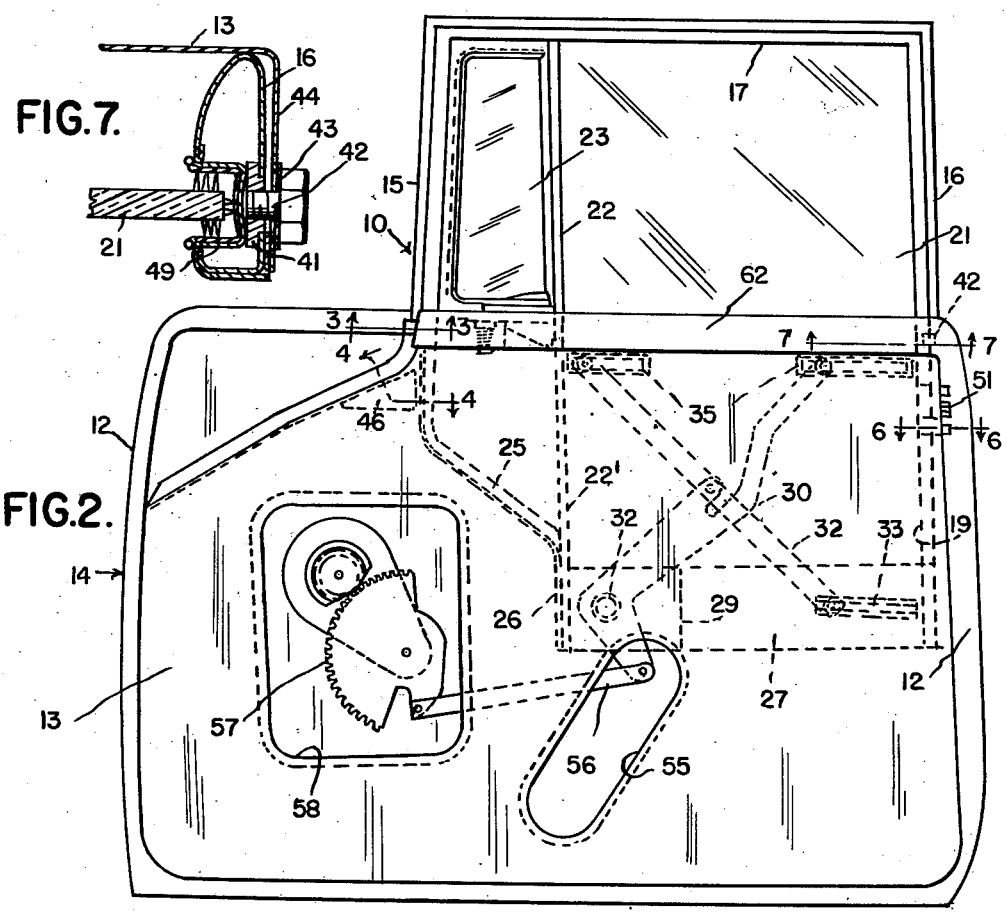
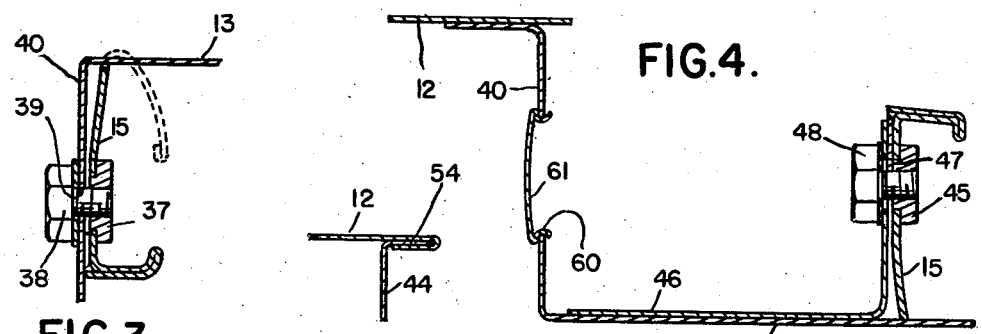
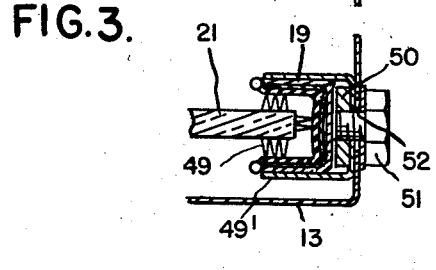
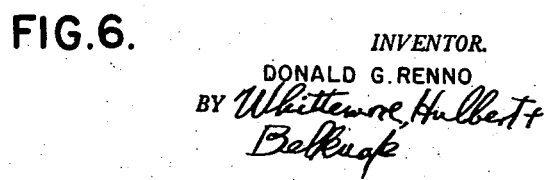
INVENTOR.
DONALD G. RENNO
BY *Whittemore, Hulbert & Belknap*
ATTORNEYS

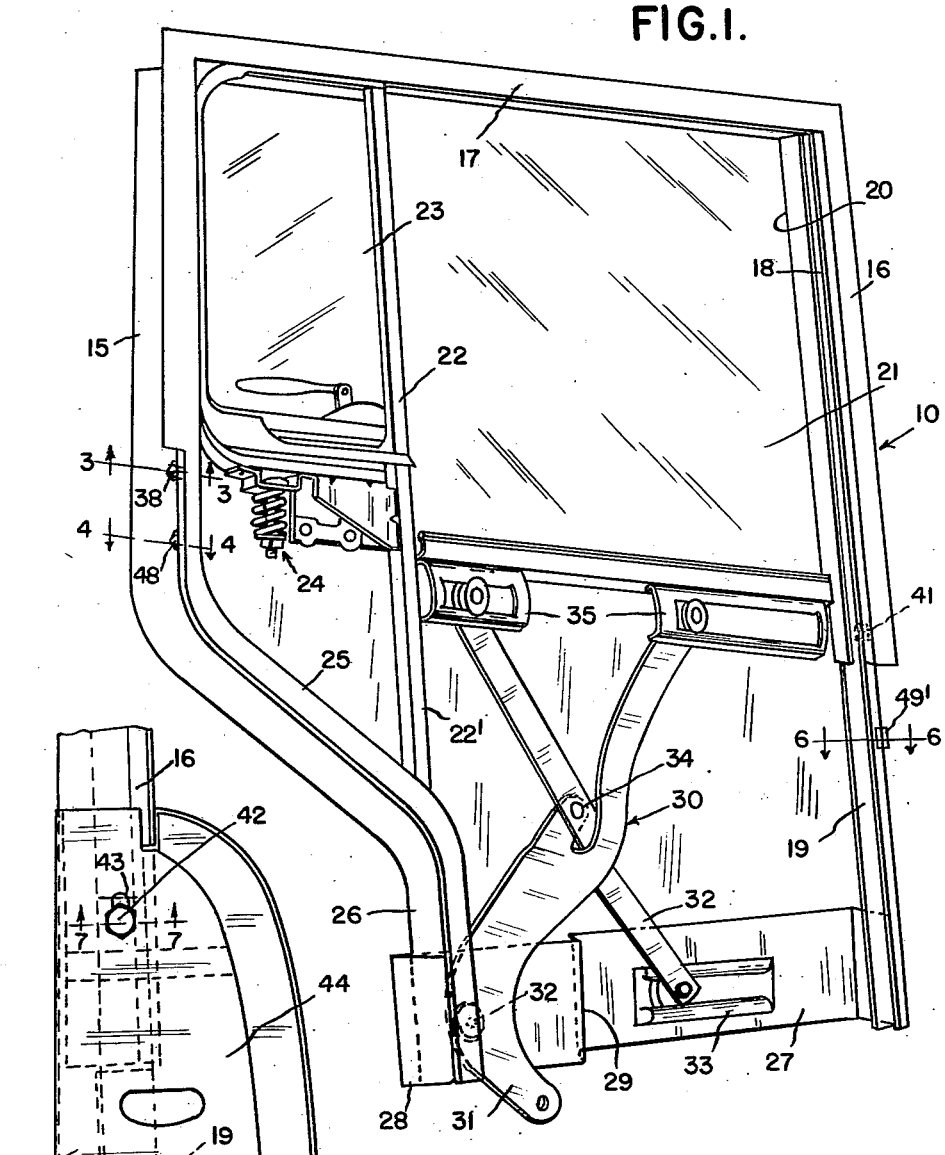

United States Patent Office 2,797,127
Patented June 25, 1957

2,797,127

VEHICLE DOOR STRUCTURE

Donald G. Renno, Birmingham, Mich., assignor to Motor Products Corporation, Detroit, Mich., a corporation of New York Application February 6, 1956, Serial No. 563,685

4 Claims. (Cl. 296—44)

This invention relates to improvements in automobile doors of the general class having a composite structure wherein a separately formed upper frame surrounds a window opening on top and sides and is affixed to a supporting lower door structure commonly composed of two unitary stampings that are marginally joined and longitudinally disposed to form a window-receiving well.

More particularly, the invention deals with an improved combination of an upper door frame, movable window glass panel and window panel regulating mechanism that is adapted for association in a novel manner with the supporting lower door structure by incorporation of provisions for a laterally swingable adjustment of the position of the upper frame relative to the lower door structure, to permit alignment with adjacent surfaces of the automotive body structure, and for a cooperating movement of the window regulating mechanism to the end that the pre-set relation of window panel to the regulating mechanism is not subsequently disturbed.

In the manufacture of automotive door and window assemblies, it has been customary to separately mount the movable window regulating mechanism on the interior panel forming a side wall of the lower door structure, thus rigidly fixing the transverse position of the mechanism. A transverse displacement of the upper frame, forcible or by means of an adjusting device, thereupon disturbed the relation of the movable glass panel and its regulating mechanism with deleterious effects when the displacement was excessive. It also has been customary to separately install upper door frame, movable window panel and window regulator mechanisms upon the lower door structure and to make fitting and alignment adjustments on a moving assembly line, under conditions that often preclude good workmanship.

It is an object of this invention to provide a unitary upper window frame and regulator unit to facilitate initial installation and accurate setting of the movable window and its regulating mechanism, so they can be pre-assembled and adjusted in their ultimate operating association prior to installation on the supporting lower door structure and maintain the correct operating relation when adjustment of upper frame is required for fit with surrounding body surfaces. The improved unit has particular advantage when the regulating mechanism is a power operated one, although manually operated installations also benefit in the assembly phase by the invention.

The foregoing as well as other objects of the invention will become more apparent as this description proceeds, especially when taken in conjunction with the accompanying drawings, in which:

Figure 1 is a perspective view of the improved package unit or structure, as viewed from the inner side thereof;

Figure 2 is an elevational view of the unit as operatively installed on an encasing, outer and inner door assembly or structure;

Figures 3 and 4 are, respectively, enlarged fragmentary views on lines corresponding to lines 3—3 and 4—4 of Figures 1 and 2;

Figure 5 is a fragmentary enlarged view of the rear end of the door construction, as viewed from the right of Figure 2; and Figures 6 and 7 are, respectively, enlarged fragmentary views in horizontal section along lines 6—6 and 7—7 of Figures 1, 2 and 5.

The improved window frame and regulator package unit of the invention is, per se, illustrated in Figure 1 of the drawings and designated generally by the reference numeral 10. It is ultimately assembled, as shown in Figure 2, with a lower door assembly or structure, which may be considered to comprise an outer finish door panel 12 and an inner door panel 13 of slightly less area, appropriately contoured for rigid assembly with the outer panel. Generally considered, the shaping and mode of assembly of the panels 12, 13 to constitute a lower door assembly, generally designated 14, is not controlling as to the invention, save in respect to the improved manner of assembling thereto the package unit 10, as will be described.

The frame unit 10 comprises substantially parallel upright, front and rear frame members or posts 15, 16, respectively, of strong, rigid rolled sheet metal, integrally connected at their top by a like rolled cross piece 17. A conventional window guide channel 18 is rigidly secured to the inner surface of the rear post member 16, in a conventional manner, a bottom extension 19 of this channel extending well below a window frame opening 20 in which the window panel 21 is slidably guided at one edge by the channel. An upright division bar 22 is rigidly secured to the frame cross piece 17, this division bar carrying a guide similar to the channel 18 and extending substantially downwardly at 22′ beneath the window opening 20.

A ventilator window panel 23 is pivotally mounted in the frame 10 forwardly of division bar 22, as by a conventional vertical hinge arrangement 24, the ventilator having appropriate sealing provisions engageable with the forward frame post 15 and division bar 22 to seal it in its closed position. The window guide and pivoting provisions described above are, in general, conventional and well known.

The lower portion forward frame post or member 15 is brought rearwardly at 25 at an angle of about 45 degrees for a substantial length, and adjacent the lower limit of this length it has the division bar bottom extension 22′ rigidly secured thereto, as by welding. Member 15 is then angled in a substantially vertical direction at 26, terminating at approximately the same level as the bottom of the frame channel extension 19.

The lower extremities of the parts 19, 26 are rigidly and ruggedly tied together by a flat and rigid cross plate or strap 27 of substantial width, which is welded at its inturned end flanges 28 to web surfaces of the bottom extension members 26, 19. Intermediate its ends, the strap 27 has a 90 degrees' offset at 29 to afford proper operating clearance for moving parts mounted thereby.

The movable operating structure, as herein shown, comprises a scissor-type window regulator mechanism, generally designated 30, although it will be appreciated that other types may be employed, and that the mounting provisions constituted by the welded strap and frame structure referred to above, may be modified as required to accommodate the same. As herein shown, the regulator 30 comprises a cross arm member 31 pivoted at 32 on an inwardly offset portion of strap 27, and an associated lever arm 32 pivotally and slidably guided in a way 33 secured to strap 27. Upper extensions of these members, which are pivotally articulated at 34, are similarly guided in appropriate ways 35 rigidly secured to a window cross piece of the window panel 21.

A unitary frame and regulator structure is provided which enables the window panels 21, 23 to be bench-assembled and adjusted as to their operating connections, as of the mechanism 30, to the parts which movably mount and guide the mechanism. Once assembled and adjusted, the package unit 10 may then be assembled to and adjustably mounted in relation to the door body (not shown) by the improved provisions to be described.

As illustrated in Figures 1 and 2, and in the detail views of Figures 3 and 4, the forward frame upright 15 has a mounting and pivoting nut 37 (Figure 3) secured to its inner surface, as by welding, at substantially the level of the bottom of ventilator panel 23, which nut threadedly receives a pivot bolt or stud 38 extending through vertically elongated pivot hole or slot 39 in a 90 degrees flange 40 of the inner panel 13 of the encasing lower door assembly or structure 14. Similarly, as best shown in Figures 5 and 7, the rear frame post member 16 carries a welded pivot lock nut 41 at a corresponding elevation, which threadedly receives a pivot bolt or stud 42 extending through a vertically elongated pivot aperture or slot 43 in an opposed, rear flange 44 of the inner panel 13. The slots 39, 43 confine the pivots 38, 42, respectively, in the lateral or horizontal sense while permitting pivoting of frame unit 10, and also permit vertical adjusting shift, if that is found necessary.

In downwardly spaced relation to its pivot lock nut 37 (as best shown in Figure 4), the forward frame upright 15 has a further lock nut 45 welded to its inner surface; while a mounting bracket 46 fixed on the inner panel 13 is provided with an aperture or slot 47 of substantial horizontal and vertical dimensions, through which a locking bolt or stud 48 extends for threaded engagement with the nut 45. Similarly, as illustrated in Figure 6, the window frame channel extension 19, in which conventional guide means 49 are disposed, is equipped with a short U-shaped bracket 49'; and the bracket has a lock nut 50 welded to its cross web. This nut threadedly receives a lock bolt or stud 51, which extends through a slot 52 of substantial horizontal and vertical dimensions in the end flange 44 of the inner panel 13. Slots 47, 52 permit swinging and vertical shifting of the frame, as mentioned above.

The inner and outer panels 13, 12, respectively, of the door structure 14, in which the lower portion of the frame-regulator package 10 is encased, are assembled in a conventional manner, as by flanging and crimping at 54, and, as stated above, details may vary in this respect, with which the invention is not concerned.

As illustrated in Figure 2, the inner panel 13 may be provided with an elongated access aperture 55 for adjustment of an operating linkage 56 connecting the mechanism 30 with an operator 57, to which access may be had through a further opening 58 in panel 13.

Upon initial installation and adjustment of the window regulator and operating mechanisms, as described, the unit 10 may be installed directly from the bench onto the remaining door structure 14 by simply lowering the same into the window well defined between the outer and inner panels 12, 13, and by applying and preliminarily taking up the respective upper pivot bolts 38, 42 and the lower front and rear lock bolts 48, 57, respectively. When the thus constituted door has been mounted to the automobile body (not shown), the position of the frame unit 10 may then be adjusted by swinging it about front and rear pivot bolts 38, 42, respectively, or by vertically shifting the unit as required, after which the pivot bolts and lower lock bolts 48, 51 may be taken up tightly to clamp the frame and door structure, the enlarged slots 47 and 52 permitting the previous swinging and shifting adjustment as referred to. An access port or opening 60 is provided in the flange 40 of the inner door panel 13 (Figure 4) for the insertion of a tool to take up the bolt, this port normally being closed by a snap disc 61.

With the parts assembled, as described, suitable upholstery or the like is applied over the inner panel 13, using appropriate fasteners (not shown) for this purpose, and finish or trim moulding 62 is then applied, as depicted in Figure 2.

The drawings and the foregoing specification constitute a description of the improved vehicle door structure in such full, clear, concise and exact terms as to enable any person skilled in the art to practice the invention, the scope of which is indicated by the appended claims.

What I claim as my invention is:

1. A window frame and regulator package unit for adjustable mounting on outer door structure to constitute an automotive or like door, comprising a frame defining an opening to slidably receive a window, said frame including upright front and rear members, a brace member rigidly tying the lower portions of said frame members to one another, a regulator mechanism movably mounted on said brace member for operative connection to a window moving in said opening, and means for adjustably mounting said frame on said outer door structure.

2. A window frame and regulator package unit for adjustable mounting on outer door structure to constitute an automotive or like door, comprising a frame defining an opening to slidably receive a window, said frame including upright front and rear members, a brace member rigidly tying the lower portions of said frame members to one another, a regulator mechanism movably mounted on said brace member for operative connection to a window moving in said opening, and means adjustably mounting said frame on said outer door structure, comprising aligned pivot means on said frame members operatively engaged with opposite ends of said structure to support the frame for swinging adjustment.

3. A window frame and regulator package unit for adjustable mounting on outer door structure to constitute an automotive or like door, comprising a frame defining an opening to slidably receive a window, said frame including upright front and rear members, a brace member rigidly tying the lower portions of said frame members to one another, a regulator mechanism movably mounted on said brace member for operative connection to a window moving in said opening, and means adjustably mounting said frame on said outer door structure, comprising aligned pivot means on said frame members operatively engaged with opposite ends of said structure to support the frame for swinging adjustment, and further means in vertically spaced relation to said respective pivot means to operatively engage said ends of said structure and lock said frame in adjusted position, said further means permitting said swinging adjustment.

4. A window frame and regulator package unit for adjustable mounting on outer door structure to constitute an automotive or like door, comprising a frame defining an opening to slidably receive a window, said frame including upright front and rear members, a brace member rigidly tying the lower portions of said frame members to one another, a regulator mechanism movably mounted on said brace member for operative connection to a window moving in said opening, means adjustably mounting said frame on said outer door structure, comprising aligned pivot means on said frame members operatively engaged with opposite ends of said structure to support the frame for swinging adjustment, and means to lock said frame in adjusted position.

References Cited in the file of this patent

UNITED STATES PATENTS

| | | |
|---|---|---|
| 2,361,608 | Doty | Oct. 31, 1944 |
| 2,566,871 | Bedford et al. | Sept. 4, 1951 |
| 2,650,857 | Watter | Sept. 1, 1953 |
| 2,658,790 | Fish et al. | Nov. 10, 1953 |
| 2,733,096 | Waterhouse et al. | Jan. 31, 1956 |